United States Patent
Roy et al.

(10) Patent No.: US 12,314,757 B1
(45) Date of Patent: May 27, 2025

(54) EFFICIENT RESOURCE SCHEDULING USING ADAPTIVE SCHEDULING CRITERIA

(71) Applicant: Vista Tech LLC, Fort Lauderdale, FL (US)

(72) Inventors: Vinay Roy, Delray Beach, FL (US); Pengyi Sun, Weston, FL (US); Mikhail Tamm, Tallinn (EE); Sapon Tanachaiwiwat, Boca Raton, FL (US); Rudraksh Syal, San Jose, CA (US)

(73) Assignee: Vista Tech LLC, Fort Lauderdale, FL (US)

( * ) Notice: Subject to any disclaimer, the term of this patent is extended or adjusted under 35 U.S.C. 154(b) by 0 days.

(21) Appl. No.: 18/205,702

(22) Filed: Jun. 5, 2023

Related U.S. Application Data

(60) Provisional application No. 63/354,921, filed on Jun. 23, 2022.

(51) Int. Cl.
  *G06F 9/48* (2006.01)
  *G06F 11/34* (2006.01)

(52) U.S. Cl.
  CPC ........ *G06F 9/4881* (2013.01); *G06F 11/3423* (2013.01)

(58) Field of Classification Search
  CPC .................................................. G06F 9/4881
  See application file for complete search history.

(56) References Cited

U.S. PATENT DOCUMENTS

| | | | |
|---|---|---|---|
| 2013/0124826 A1* | 5/2013 | Merchant | G06F 11/3409 |
| | | | 712/205 |
| 2023/0273833 A1* | 8/2023 | Jin | G06F 9/505 |
| | | | 718/104 |

* cited by examiner

*Primary Examiner* — Michael J Metzger
(74) *Attorney, Agent, or Firm* — Fish & Richardson P.C.

(57) ABSTRACT

Methods, systems, and apparatus, including medium-encoded computer program products, for using adaptive scheduling criteria to efficiently schedule resources based on dynamically changing data. In one aspect, a method includes obtaining, by the resource scheduler and from multiple resource consumers, resource requests for consuming a set of resources. For each of multiple resource usage time periods for the set of resources, a respective actual utilization rate for the set of resources during the resource usage time period is updated. For each resource usage time period, the respective actual utilization rate for the resource usage time period is compared to a target utilization rate. A determination is made, based on the comparing, that the respective actual utilization rate for a given resource usage time period is at least a threshold amount different from the target utilization rate. A scheduling criterion that conditions subsequent resource requests for the set of resources is adjusted.

23 Claims, 6 Drawing Sheets

EFFICIENT RESOURCE SCHEDULING USING ADAPTIVE SCHEDULING CRITERIA

CROSS-REFERENCE TO RELATED APPLICATION

This application claims priority to U.S. Provisional Patent Application No. 63/354,921, filed on Jun. 23, 2022. The disclosure of the prior application is considered part of the disclosure of this application and is incorporated in its entirety into this application.

TECHNICAL FIELD

This specification is related to data processing and machine learning.

BACKGROUND

Resource scheduling is a process of assigning workloads to resources. A schedule can include a workload to be executed, the resource or resources that will perform tasks of the workload, and a start time at which the tasks of the workload should be performed. Schedules typically include many workloads such that allocating resources for workloads to optimize efficiency is often a complex and computationally expensive task, especially when the resources are often changing over time.

SUMMARY

This specification describes technologies relating to scheduling resources for workloads in dynamic and flexible ways to improve the efficiency of the resources and rapidly account for continuously changing resource characteristics, such as changing resource utilization rates and uncertain workload demand. A workload can include one or more tasks to be performed by one or more resources. An actual utilization rate can describe the expected use of resources at a future time, and can be compared to a target utilization rate for each resource usage time period. One or more scheduling criteria can be adjusted based on a dynamically changing utilization rates for the resources. For example, the scheduling criteria can be updated in real-time or near real-time (e.g., within milliseconds of an update event such as a new resource request) if the actual utilization rate differs from the target utilization rate by more than a threshold amount.

In general, one innovative aspect of the subject matter described in this specification can be embodied in methods that include obtaining, by the resource scheduler and from multiple resource consumers, resource requests for consuming a set of resources, each resource request including (i) an indication of a workload comprising one or more tasks to be performed by a resource and (ii) an indication of a start time for the workload; updating, based on one or more requirements of each workload and for each of a plurality of resource usage time periods for the set of resources, a respective actual utilization rate for the set of resources during the resource usage time period; for each resource usage time period, comparing the respective actual utilization rate for the resource usage time period to a target utilization rate; determining, based on the comparing, that the respective actual utilization rate for a given resource usage time period is at least a threshold amount different from the target utilization rate; for the given resource usage time period: adjusting a scheduling criterion that conditions subsequent resource requests for the set of resources on the resource request satisfying the scheduling criterion for the given resource usage time period based at least on the respective actual utilization rate for the given resource usage time period being at least a threshold amount different from the target utilization rate; providing the adjusted scheduling criterion to one or more resource consumers; receiving, from a given resource consumer in the one or more resource consumers, an additional resource request comprising (i) an indication of an additional workload and (ii) an indication of a start time of the additional workload that occurs during the given resource usage time period; and in response to determining that the additional workload satisfies the adjusted scheduling criterion, effectuating performance of one or more tasks of the additional workload by a given resource of the set of resources. Other implementations of this aspect include corresponding apparatus, systems, and computer programs, configured to perform the aspects of the methods, encoded on computer storage devices.

These and other embodiments can each optionally include one or more of the following features. In some aspects, adjusting a scheduling criterion further includes processing input data comprising characteristics of one or more resource requests using a trained machine learning model trained to output a recommended adjustment to the scheduling criterion, updating the scheduling criterion using the recommended adjustment, and updating a user interface of one or more resource consumers to display the updated scheduling criterion.

In some aspects, adjusting a scheduling criterion includes evaluating a scheduling criterion adjustment rule. The additional request to consume resources can be a request to create a new client-initiated private jet segment.

In some aspects, updating the respective actual utilization rate for each resource usage time period includes determining a reset penalty. The reset penalty represents a number repositioning segments during previous resource usage time periods.

Some aspects include determining the target utilization rate for the resource based on an average of prior actual utilization curves. In some aspects, determining the actual utilization rate includes preprocessing historical utilization rate data. Preprocessing comprises one or more of removing erroneous data, removing outliers, or imputing missing values. Preprocessing the data can include receiving data related to previous resource usage from multiple data sources and formatting the received data into a common format for which a machine learning model is configured to process as input to the machine learning model.

In some aspects, adjusting a scheduling criterion for the given resource usage time period includes determining to adjust the scheduling criterion based on (i) the respective actual utilization rate for the given resource usage time period being at least a threshold amount different from the target utilization rate and a hysteresis period for the given resource usage time period being elapsed.

In some aspects, the actual utilization rate for each resource usage time period is based on a number of resources in the set of resources, a workload factor that represents the number of workloads a resource performed during a resource usage time period, and a duration factor that represents the duration of workloads.

In some aspects, adjusting the scheduling criterion includes determining a number of resource usage time periods between a current time and a time at which the given resource usage time period is scheduled to being and adjusting the scheduling criterion based on the number of resource usage time periods.

Particular embodiments of the subject matter described in this specification can be implemented so as to realize one or more of the following advantages. The techniques described below can be used to schedule resources for workloads such that the resources are neither oversubscribed nor undersubscribed. The techniques can be used to dynamically and rapidly adjust scheduling criteria that results in efficient scheduling despite dynamically changing characteristics, e.g., utilization rates, of the resources and uncertain workload demand. Preprocessing and machine learning models can be used to transform data received from multiple data sources into data that can be quickly and efficiently analyzed in real-time as the data is received to determine whether to adjust scheduling criteria and, if so, generate adjusted scheduling criteria and use the adjusted scheduling criteria to efficiently schedule resources for subsequent resource requests. As the amount of data and the number of data sources can be substantial, this can significant reduce the computational burden (e.g., the number of central processing unit (CPU) cycles) placed on computing resources configured to adjust the scheduling criteria and schedule resources for workloads based on the adjusted scheduling criteria. As the amount of data that is processed to determine whether to adjust scheduling criteria is substantial, preprocessing the data and using data processing models, machine learning models, and/or other appropriate models or sets of rules to adjust scheduling criteria enables real-time decisions that are objectively fair and for scaling for application to many different resources which would not be possible without the techniques described in this document. In addition, the techniques described below can be used to create a fair schedule in which workloads are not lacking appropriate resources.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
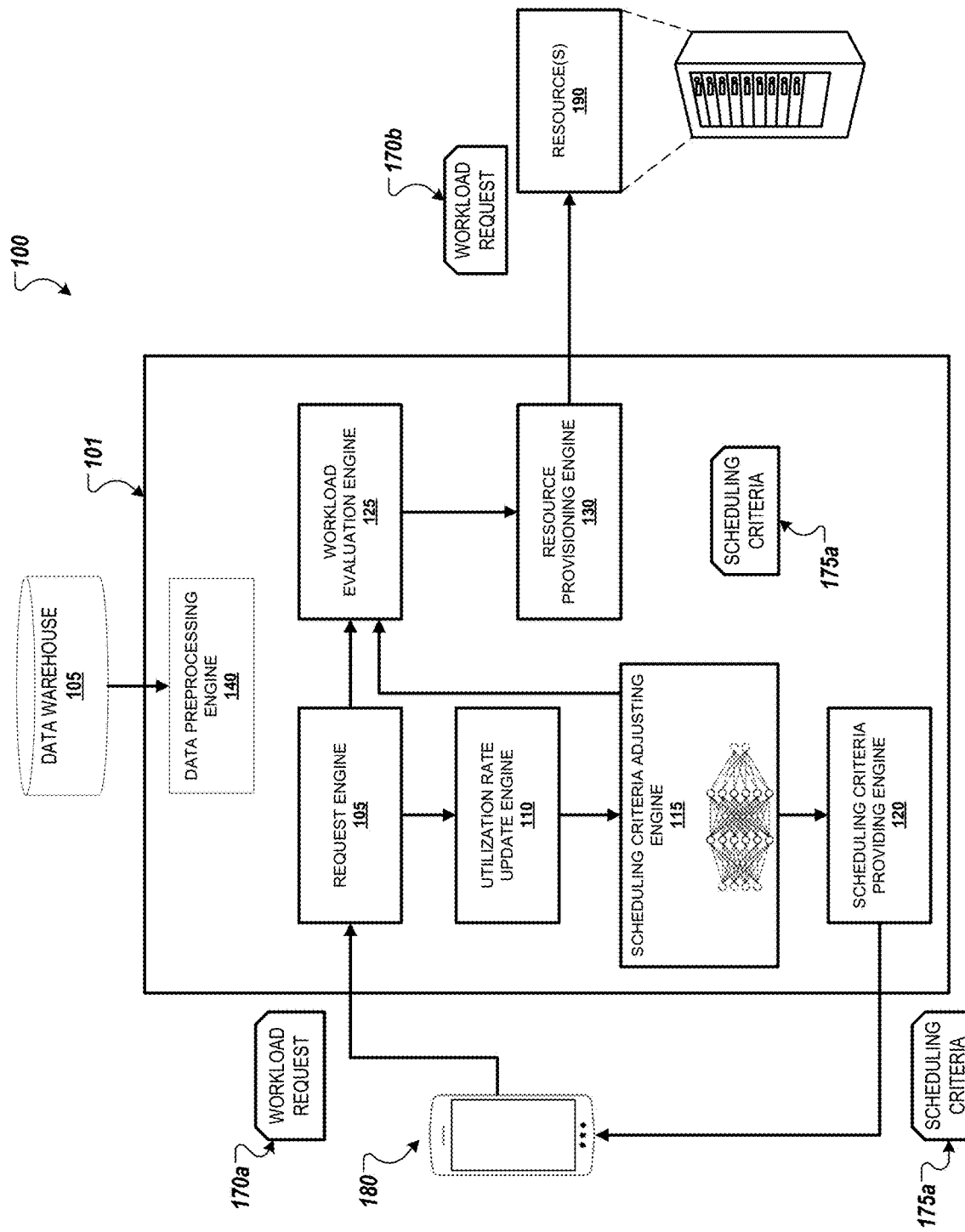
FIG. 1 shows an example of an environment in which a resource scheduling system schedules resources using scheduling criteria.

Resource scheduling can include assigning workloads to resources configured to perform, e.g., execute, one or more tasks of the workloads. Workloads can be assigned to resources "just in time"—that is, as workload requests arrive at a system, the system can assign the workloads to resources that are both available at the time the workloads are to be performed and configured to execute the workloads. If no such resource is available, the workload can be delayed or rejected. Such an approach has the obviously drawback of uncertainty: requesters, e.g., users, submitting workloads do not know if their workloads will be executed. In addition, such system can lack fairness. Users who submit numerous, perhaps large workloads that consume resources for long periods of time, can starve other requesters of resources.

To address these drawbacks partially, resource reservations can be introduced. With a resource reservation, resource users can request resources at a future time. Reservations can be useful as they provide a level of certainty: users know in advance whether their workloads will be executed at a specified time. However, such a system does not address concerns regarding fairness; requesters can still submit large numbers of workloads to the detriment of other resource requesters.

Scheduling criteria can be used to provide further improvement. Scheduling criteria define conditions under which a workload can be executed using the resources. Scheduling criteria can define a wide range of factors that can be considered. For example, to address fairness concerns, scheduling criteria can specify that a requester can schedule only a limited number of workloads over a given period. In another example, to account for differences in workload demands, each resource requester can provide "credits" that represent a potential use of resource. For example, one credit can represent the ability to use some amount of resource for one quantum of time. Using such techniques, a workload can be executed only if the user has provided or committed to provide sufficient credits to complete the work.

However, a drawback of such static scheduling criteria is that the criteria can encourage underuse and overuse of the resources. If the scheduling criteria are too strict, resources can go unused, provided inefficiencies; if scheduling criteria are too permissive, resources can be overscheduled, reintroducing fairness concerns.

The techniques described below include adaptive scheduling criteria. The system can alter the scheduling criteria for a set of resources over time based on actual utilization of the resources. The actual utilization can represent the demand for the resources. When the system detects that the quantity of resource reservations is below a threshold (or at least a threshold amount below a target), the system can adjust the scheduling criteria to be more permissive; when the system detects that the quantity of resource reservations is above a threshold (or at least a threshold amount above a target), the system can adjust the scheduling criteria to be less permissive. The threshold can be set by determining a target utilization, and establishing thresholds above and below the target, as described further below. By adapting scheduling criteria dynamically, the system can encourage efficient and effective resource usage, while preserving fairness, and well as increasing the amount of credits received by a service provider that provisions the resources for the resource users.

In some implementations, the adaptive scheduling techniques described in this document can be applied to scheduling computing workloads, autonomous vehicle deliveries, manufacturing equipment, or private jet segments, to name just a few examples. In a private jet example, each workload can be a private jet segment from an origin to a destination on a particular departure date and each resource can be a private jet. The scheduling system can adapt scheduling criteria for such segments based on dynamic changes to characteristics of one or more fleets of private jets.

As used throughout this document, a segment refers to a flight between an origin and a destination. The term segment refers to any type of flight that carries clients, including charters (e.g., a flight between two locations freely specified by a client). The aircraft used to travel between the origin and destination is typically a non-commercial aircraft (e.g., a private jet). While any appropriate type of aircraft (e.g., a propeller aircraft, a jet aircraft, or a rotorcraft) can be used, they will be collectively referred to using the term "jet" for brevity.

FIG. 1 shows an example of an environment 100 in which a resource scheduling system 101 schedules resources using scheduling criteria. The environment 100 includes the resource scheduling system 101, client devices 180, data warehouses 105, and resources 190. The environment 100 can include many data warehouses 105, client devices 180 and resources 190. The resource scheduling system 101 can be operated and maintained by a service provider that provisions resources to resource users. The resources can include resources of the service provider and/or third-party resources made available to the resource users of the service provider by third-parties that own, operate, and/or maintain the resources.

Client devices 180 are electronic devices capable of communicating over the network. Example client devices 180 include personal computers, mobile communication devices, e.g., smart phones, and other devices that can send and receive data, including workload requests 170a, 170b, over the network. A client device 180 can include a display capable of displaying a user interface. The display can also be a touch screen display capable of detecting user interactions such as "taps" and "swipes." The client device 180 can include other input and output mechanisms and/or devices.

Resources 190 to which workloads can be scheduled can include any device or equipment capable of performing workloads. Resources can include, without limitation, computer servers, storage devices, network bandwidth, three-dimensional (3D) printers, human-operated and autonomous vehicles (e.g., automobiles, boats, airplanes), among many other examples.

Workloads requests 170a, 170b (collectively referred to as workload requests 170) can include an indication of a workload to be performed by a resource and an indication of a desired start time of the workload. An indication of a workload can include indicators for any task or operation to be performed by a resource 190. Examples of workloads can include, without limitation, executing all or part of a computer program, storing or retrieving data, performing machine learning computations (e.g., classifying an object such as an object in an image), transmitting data over a network, 3D printing an object, transporting persons or cargo from a first location to second location, and so on. Workload requests 170 describe workloads that can consume all of part of a resource 190 for a period of time that can depend on both the workload and the resource. For example, a computer server with a faster processor might complete a workload in a shorter amount of time than would a computer server with a slower processor; some 3D printers are capable of printing faster than others; vehicles differ in speed, capacity, and range; and so on. Workload requests 170 can include, without limitation, a reference to the workload to be performed (e.g., a Uniform Resource Indicator (URI)), a description of the workload, a reference to a description, the work to be performed (e.g., computer code to be executed on a processor), a route for a vehicle (e.g., an origin and destination for a segment) or any combination thereof.

The indication of the desired start time for a workload can include a specified start time or a time window within which the workload should be performed. Such a window provides flexibility for the resource scheduling system 101. For segments, the desired start time can be a departure time.

Data warehouses 105 can be storage systems configured to store data for use in the environment 100. Data warehouses 105 can store a broad range of types of data, and can store massive volumes of data. For example, data warehouses 105 can store historical data relating to the arrival of workload requests 170, data of the workload requests 170, data relating to the resource scheduling system 101, and prior utilization rates for resources at various time intervals before the resource perform the workloads. Data warehouses 105 can be any appropriate storage system, such as a relational database, an unstructured database, block storage, and so on.

The data warehouses 105 can include many different data sources that are not part of the resource scheduling system 101. For example, some data warehouses 105 can be remote data sources (e.g., remote servers connected to the resource scheduling system 101 via a network) that maintain data that is used by the resource scheduling system 101. The data of such data warehouses 105 can be stored in unstructured and/or unformatted ways. In addition, the data can be formatted differently in each data warehouse 105. As described below, the data preprocessing engine 140 can preprocess the data prior to being used by the various engines of the resource scheduling system 101. This improves the speed and accuracy of the computations of the engines. This preprocessing enables the engines of the resource scheduling system 101 to compute updated utilization rates and scheduling criteria in real-time (e.g., in milliseconds) based on continuously changing unformatted and unstructured data received by the resource scheduling system 101.

The resource scheduling system 101, which can also be called a "resource scheduler" for brevity, can include a request engine 105, a utilization rate update engine 110, a scheduling criteria adjustment engine 115, a scheduling criteria providing engine 120, a workload evaluation engine 125, a workload providing engine 130 and a data preprocessing engine 140. As used herein, the term engine refers to a data processing apparatus that performs a set of tasks. The engines of the resource scheduling system 101 can be implemented using one or more data processing apparatus that may be distributed and connected via a data communication network.

The request engine 105 is configured to accept workload requests 170, e.g., from client devices 180. The request engine 105 can accept workload requests 170 using any appropriate technique. For example, the request engine 105 can provide an Application Programming Interface (API), which, when invoked by a client device 180, can accept workload requests 170. The request engine 105 can provide the workload request 170 to the utilization rate update engine 110 and to the workload evaluation engine 125.

The utilization rate update engine 110 is configured to determine the utilization rate of the resources 190, or any subset of resources 190, for one or more future time periods. The utilization rate update engine 110 can provide a utilization rate indicator to the schedule criteria adjustment engine 115. Utilization rate indicators can include a description of the resource 190 for which the utilization is measured or predicted, a description of the time period to which the utilization is relevant, and a measure of the utilization, e.g., a percentage of the resources that will be utilized over the time period. For example, the utilization rate update engine 110 can determine, e.g., predict, the utilization of a set of resources for each of multiple resource usage time periods.

A resource usage time period can be any duration of time and can vary for different implementations and/or for different types of resources. Example resource time periods include 5 minutes, 30 minutes, 1 hour, 1 day, 1 week, etc. The utilization rate for a resource usage time period can indicate the amount, e.g., percentage, of resources that would otherwise be available to start a workload during the resource usage time period but are reserved for workloads. In another example, the utilization rate for a resource usage time period can indicate an amount, e.g., percentage, of an available capacity of the resources to perform workloads during the resource usage time period that has been reserved for workloads. In a segment scheduling example, the utilization rate can indicate an amount, e.g., percentage, of the available hours of a set of jets to depart during the resource usage time period that have been reserved for segments that depart during the resource usage time period (e.g., a ratio between the reserved hours and the total available hours for the jets).

Each resource usage time period can include a corresponding callout time period that indicates and amount of time between the start of the resource usage time period and a current time. For example, if each resource usage time period is a day and the resource scheduling system 101 enables resource users to schedule resources up to 90 days in advance, there would be 90 different resource usage time periods (one for each day) and each resource usage time period would have a corresponding callout time period. The callout time period for the resource usage time period that is 90 days from the current time would be 90 days, whereas the callout time period for the resource usage time period that is one day from the current day would be one day. As time passes, the callout time period for each resource usage time period progresses toward zero until the start time of the resource usage time period is reached.

The scheduling criteria adjustment engine 115 is configured to receive utilization rate indicators, determine whether schedule criteria should be adjusted and, if so, adjust the scheduling criteria. Scheduling criteria can be any factor that can be used to set or influence a schedule or to condition the reservation of a resource. For example, a scheduling criterion can be a priority given to a type of workload, priority given to a particular set of users of client devices, an indicator of a cost required to perform a workload (e.g., in terms of credits), and so on. Scheduling criteria can be used to condition subsequent resource requests for the set of resources, e.g., in some implementations, the request must satisfy the scheduling criteria for the resource request to be honored.

The scheduling criteria providing engine 120 is configured to provide scheduling criteria 175a, 175b (collectively referred to as scheduling criteria 175) to client devices 180. For example, the scheduling criteria providing engine 120 can encode the scheduling criteria 175 in a text format such as Extensible Markup Language (XML) or Javascript Object Notation (JSON) and provide the encoded scheduling criteria 175 to a client device 180 using any appropriate transmission technique. For example, the scheduling criteria providing engine 120 can provide the encoded scheduling criteria 175 to a client device 180 by transmitting the encoded scheduling criteria 175 using Transmission Control Protocol (TCP), Hypertext Transfer Protocol (HTTP) or HTTP-Secure (HTTPS). In addition, the scheduling criteria providing engine 120 can provide the scheduling criteria 175 to the workload evaluation engine 125.

In some implementations, the scheduling criteria providing engine 120 is configured to update user interfaces of client devices 180 to display the scheduling criteria 175. For example, the client devices 180 can include a native application (e.g., an application developed for a particular platform or particular device) that displays scheduling criteria 175 to users that request the use of resources to perform workloads for the users. The native application can display various user interfaces that allow the users to view the scheduling criteria before submitting a workload request 170a to the resource scheduling system 101. The scheduling criteria providing engine 120 can update the user interfaces (or at least send updated scheduling criteria 175 to the application to be cached at the client devices 180) each time scheduling criteria 175 is updated such that each user has access to the most current scheduling criteria 175 although such scheduling criteria 175 are rapidly updated based on the workload requests 170a being received from client devices 180.

The workload evaluation engine 125 can accept workload requests 170 from the request obtaining engine 105 and can determine whether the workload request 170 represents a workload that satisfies the scheduling criteria 175. When the workload evaluation engine 125 determines that the workload request 170 satisfies the scheduling criteria 175, the workload evaluation engine 125 can provide the workload request 170 to the workload providing engine 130. The workload evaluation engine 125 can compare parameters associated with a workload request 170 to criteria related to the resources 190, and if all criteria are satisfied, the workload request 170 can be provided to the resources 190. The parameters can include, for example, requirements or target characteristics of resources for the workload. For example, a workload request 170 can describe resources 190 required to complete the workload 170. In a particular example, the parameters can include the speed of a processor for a machine learning workload or a number of spots (e.g., seats) on a jet for a segment. If the workload evaluation engine 125 determines that available resources 190 satisfy the parameters listed in the workload request 170, the workload evaluation engine 125 can provide the workload request 170 to the resource provisioning engine 130.

The resource provisioning engine 130 can provide the workload request 170 to one or more resources capable of performing the workload described by the workload request 170. In some implementations, the resource provisioning engine 130 can transform the workload request into a format appropriate for the resource 190. For example, if the resource 190 accepts requests encoded according to a specific XML schema, the resource provisioning engine 130 can perform a schema-to-schema transformation from the format used in the workload request 170 (e.g., XML or JSON, as described above) to the format used by the resource 190.

The resource provisioning engine 130 can provide the workload request 170 (or the workload request encoded according to the resource 190) using any appropriate technique. For example, the resource provisioning engine 130 can call an API provided by the resource 190, place the workload request 170 in a storage location indicated by the resource 190, transmit the request over TCP or HTTP, and so on.

In some implementations, the resource provisioning engine 130 selects one or more resources for each workload based on characteristics of the workload and/or parameters of the workload request that indicates the workload. For example, some resources may be configured to perform particular tasks, while other resources are configured to perform different tasks. In another example, the resource provisioning engine 130 can select resources based on location, e.g., real-time location information for the resources 190. For example, if a workload is being requested for a particular location, e.g., a particular origin, the resource provisioning engine 130 can select from resources that are scheduled to be at that particular location at the start time for the workload or within a threshold distance of the particular location at the start time for the workload. In a particular segment scheduling example, the resource provisioning engine 130 can select from jets that are scheduled to be at an origin of a requested segment at the departure time for the segment or within a threshold distance of the origin at the departure time for the segment.

In some implementations, the resource scheduling system 101 can include a data preprocessing system 140. The data preprocessing system 140 can analyze data used by the resources scheduling system 101, including data in data warehouses 105 to ensure the integrity of the data, as described in more detail in reference to FIG. 2B.

Figure 2A:
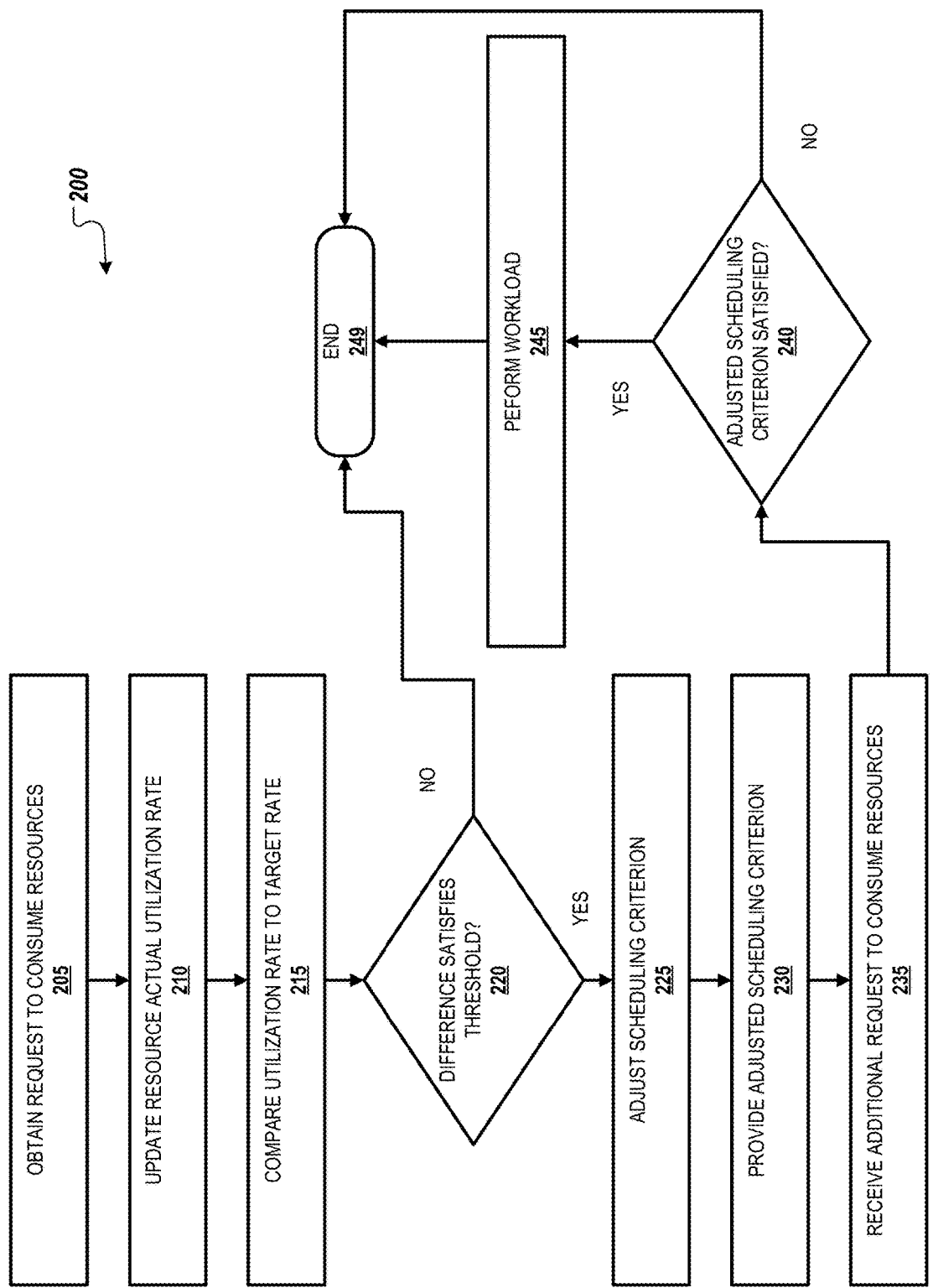
FIG. 2A is a flow diagram of an example process for scheduling resources using scheduling criteria.

FIG. 2A a flow diagram of an example process 200 for scheduling resources using adaptive scheduling criteria. For convenience, the process 200 will be described as being performed by a system for scheduling resources using adaptive scheduling criteria, e.g., the resource scheduling system 101 of FIG. 1, appropriately programmed to perform the process. Operations of the process 200 can also be implemented as instructions stored on one or more computer readable media which may be non-transitory, and execution of the instructions by one or more data processing apparatus can cause the one or more data processing apparatus to perform the operations of the process 200. One or more other components described herein can perform the operations of the process 200.

The system obtains (205) workload requests from resource consumers. The workload requests can be requests to perform workloads, e.g., one or more tasks of the workloads, using resources. As described above, each request can include an indication of a workload to be performed by a resource and an indication of a start time of the workload. The system can obtain the workload requests using an appropriate technique. For example, the system can receive workload requests included in HTTP messages on in TCP messages.

The system can update (210) actual utilization rate(s) for a set of resources. The system can determine the utilization rate for a resource during a resource usage time period based on the amount of resource available and one or more requirements of each requested workload. Requirements of a workload can characterize the resources expected to be consumed by the workload. For example, a requirement can specify that the workload is expected consume a Graphics Processor Unit (GPU) for 100 milliseconds, a trip will occupy an autonomous vehicle for two hours, and so on. The requirements can include a target or required start time for the workload. Other appropriate requirements can also be used.

The system can update the actual utilization rate for the resource usage time period(s) affected by the workload requests. For example, if a workload request requests resources for a particular resource usage time period having a corresponding callout time period of 10 days (e.g., the resource usage should start in 10 days from now), the system can update the actual resource utilization rate for that resource usage time period based on the request.

The utilization rate for a resource usage time period can be based on the amount of resources available for the resource usage time period and the amount of resources that have been reserved or scheduled to start during the resource usage time period. For example, the utilization rate for a resource usage time period can indicate an amount, e.g., percentage, of an available capacity of the resources to perform workloads during the resource usage time period that has been reserved for workloads.

In some implementations, the system can determine the amount of available resource capacity of the set of resources for a given resource usage time period based on, e.g., as a multiplicative product of, the number of resource in the set, a workload factor that represents the number of workloads a resource performed during a resource usage time period, a duration factor that represents the duration of workloads (e.g., and average duration), and/or a reset penalty (e.g., one minus a reset penalty), as shown in Equation 1, below:

$$\text{ResourceCapacity}_{available} = \text{ResourceNum} * \text{WorkloadFactor} * \text{DurationFactor}_{avg} * (1 - \text{ResetPenalty}_{avg}) \qquad (1)$$

The number of resources can be determined based on a configured value or by querying a data source (e.g., a database or a systems management platform) that contain the data. The number of resources can indicate the number of resources that are available for the resource usage time period, which can vary over time as new resources are added or removed from the set of resources.

The workload factor can be based on historical use of the resources. For example, the workload factor can represent the average number of workloads the resources in the set of resources performed during previous resource usage time periods for the set of resources. In a segment scheduling example, the workload factor can represent the number of segments per jet that depart during a resource usage time period. For example, the average number of segments per jet per day.

The duration factor can also be based on historical use of the resources. For example, the duration factor can represent the average duration of workloads performed by the set of resources during previous resource usage time periods. In a segment scheduling example, the duration factor can represent the average segment duration (e.g., average length of haul (LOH) of segments completed by a set of jets during previous resource usage time periods.

In some implementation the historical data is used to determine the workload factor and/or the duration factor until sufficient data is collected for the resource usage time period for which the utilization rate is being determined. Once sufficient data is collected, the system can determine the workload factor and/or resource duration factor using the data for workloads scheduled to start during the resource usage time period. The system can determine whether sufficient data has been collected based on the number of workloads scheduled to start during the resource usage time period. For example, the system can determine that sufficient data has been collected when the number of workloads scheduled to start during the resource usage time period satisfies a threshold, e.g., by meeting or exceeding the threshold.

The reset penalty can represent the amount of time it takes to switch a resource from performing one task to performing a second task. For example, in computing systems, a processor typically loads a new program from storage before performing a new computing task, and such loading imposes a delay. In transportation system, a vehicle might need to be relocated from one position to another before beginning a transportation task. The reset penalty for a set of resources can be determined as the average of observed reset penalties from workloads that used the resource.

In another example, the reset penalty can represent the percentage of segments that are used for repositioning purposes rather than for transporting passengers or cargo. The system can determine this reset penalty using historical data that indicates the number of repositioning segments during previous resource usage time periods and the total number of segments during the previous resource usage time periods (e.g., by dividing the number of repositioning segments by the total number of segments).

The system can determine the reserved capacity for the time period from the workloads included resource requests received for that period, e.g., as described in Equation 2, below:

$$ResourceCapacity_{reserved} = \sum_{i=1}^{NumRequestsReceived} TimeRequired(Workload_i) \quad (2)$$

The system can determine and update the actual utilization for that time period as shown in Equation 3, below:

$$Utilization_{actual} = ResourceCapacity_{reserved}/ResourceCapacity_{available} \quad (3)$$

In some implementations, the system can compare (215) the actual utilization rate for the resource usage time period (e.g., as given by Equation 3) to a target utilization rate for the resource usage time period. (The target utilization rate is described in more detail below.) If the difference between the actual utilization rate and the target utilization rate satisfies a threshold, the system can proceed to operation 220; if the difference does not satisfy the threshold, the system can proceed to operation 249 and end. Of course, the system can perform the process 200 for additional requests that are received. The difference can be measured as difference computed using subtraction, a ratio, or other appropriate mathematical relationships.

In some implementations, multiple thresholds can be used. For example, the system can use an upper threshold and a lower threshold. If the actual utilization exceeds the target utilization for the resource usage time period, the system can compare the difference between the actual and target utilization to the upper threshold. If the difference exceeds the upper threshold, the system can determine to adjust the scheduling criteria for the resource usage time period. If not, the system may leave the scheduling criteria unchanged.

If the actual utilization is less than the target utilization for the resource usage time period, the system can compare the difference between the actual and target utilization to the lower threshold. If the difference exceeds the lower threshold, the system can determine to adjust the scheduling criteria for the resource usage time period. If not, the system may leave the scheduling criteria unchanged. The upper and lower thresholds can be the same or different.

In still another example, the system can use hysteresis techniques to provide stability in the scheduling criteria. For example, a rule processed by the system can specify a hysteresis period indicating that a criterion can only change if a configured number of resource usage time periods (e.g., 1 period, 3 periods, 5 periods, etc.) have elapsed since the most recent change has been applied. Hysteresis periods can applied to cases where the scheduling criteria are made more restrictive, cases where the scheduling criteria are made less restrictive, or to both cases where the scheduling criteria are made more restrictive and less restrictive.

To determine whether to update scheduling criteria for a given resource usage time period, the system can use the threshold and the hysteresis periods. In this example, the system can determine to adjust the scheduling criteria for a resource usage time period when the difference between the actual and target utilizations exceeds a threshold (e.g., the upper threshold or lower threshold) and the hysteresis period has elapsed.

The hysteresis periods can differ depending on whether the actual utilization exceeds the target utilization. For example, the system can determine to adjust the scheduling criteria if the actual utilization exceeds the target utilization by the upper threshold and a first hysteresis period has elapsed since the last time the system adjusted the scheduling criteria for the resource usage time period in response to a situation in which the actual utilization exceeded the target utilization. In another example, the system can determine to adjust the scheduling criteria if the target utilization exceeds the actual utilization by the lower threshold and a second hysteresis period has elapsed since the last time the system adjusted the scheduling criteria for the resource usage time period in response to a situation in which the target utilization exceeded the actual utilization. The first hysteresis period can differ from the second hysteresis period.

The system adjusts (225) scheduling criteria. In some implementations, the system can obtain a target utilization curve that includes, for each number of time units from the beginning of a time period, the target utilization. The system can obtain or determine the target utilization curve. In some implementations, the system determines the target utilization curve as the average of prior actual utilization curves. In some implementations, the system can obtain a target utilization curve, e.g., by reading values defining the curve from a storage system such as a database.

Figure 3A:
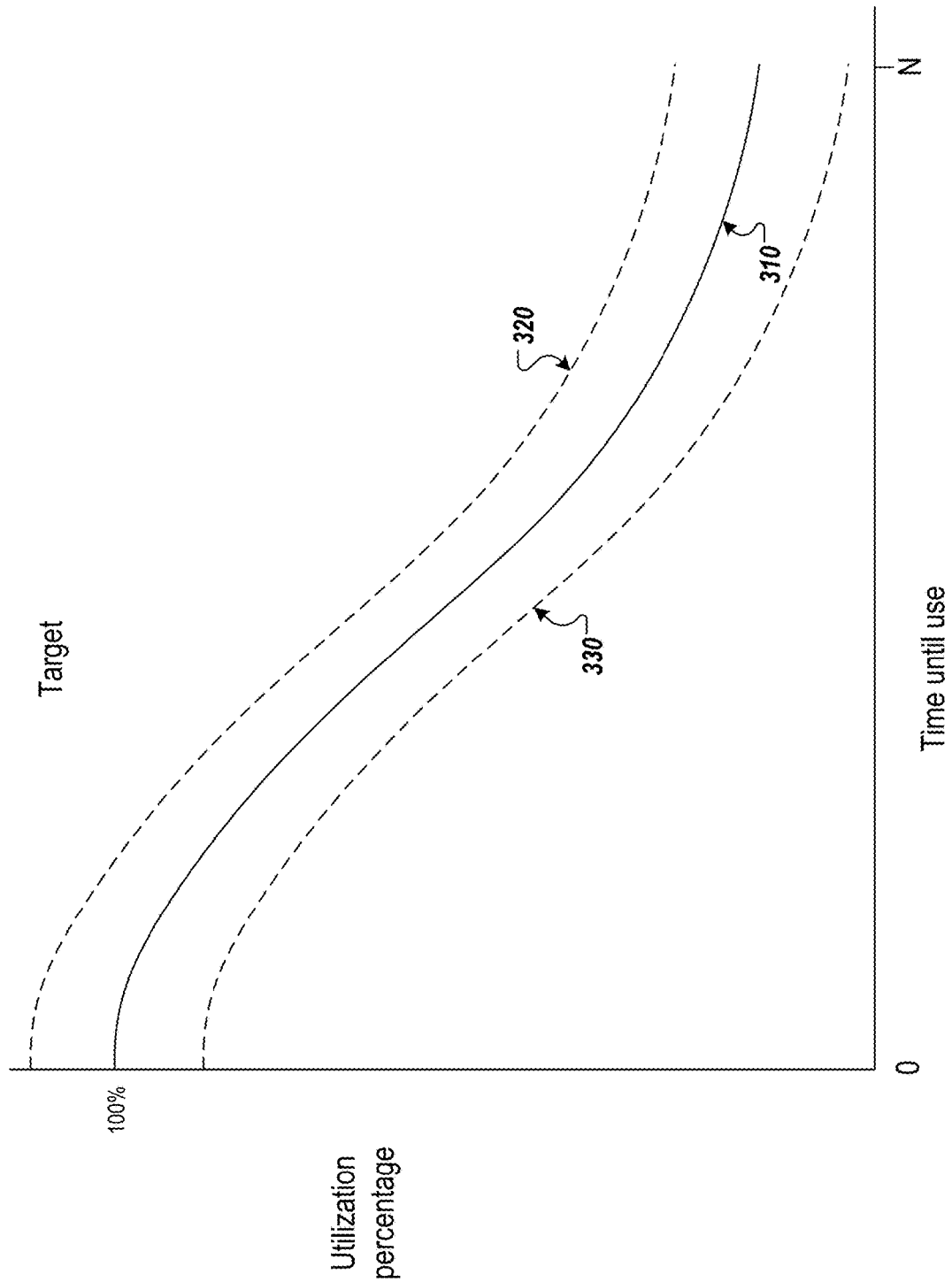
FIGS. 3A and 3B show example plots of actual utilization as a function of time.

FIG. 3A shows an example plot of target utilization as a function of time until the start of the time period. The target plot 310 shows that at N time units from the start of the resource usage time period, the target utilization is relatively low at approximately 15%, and increases until the target utilization reaches approximately 100% at time 0—that is, as the time at which the resource time period is about to begin. The target utilization curve can also include an upper boundary 320 and a lower boundary 330. As described further below, by adjusting the scheduling criteria, the system attempts to maintain actual utilization between the target upper boundary 320 and the target lower boundary 330.

Figure 3B:
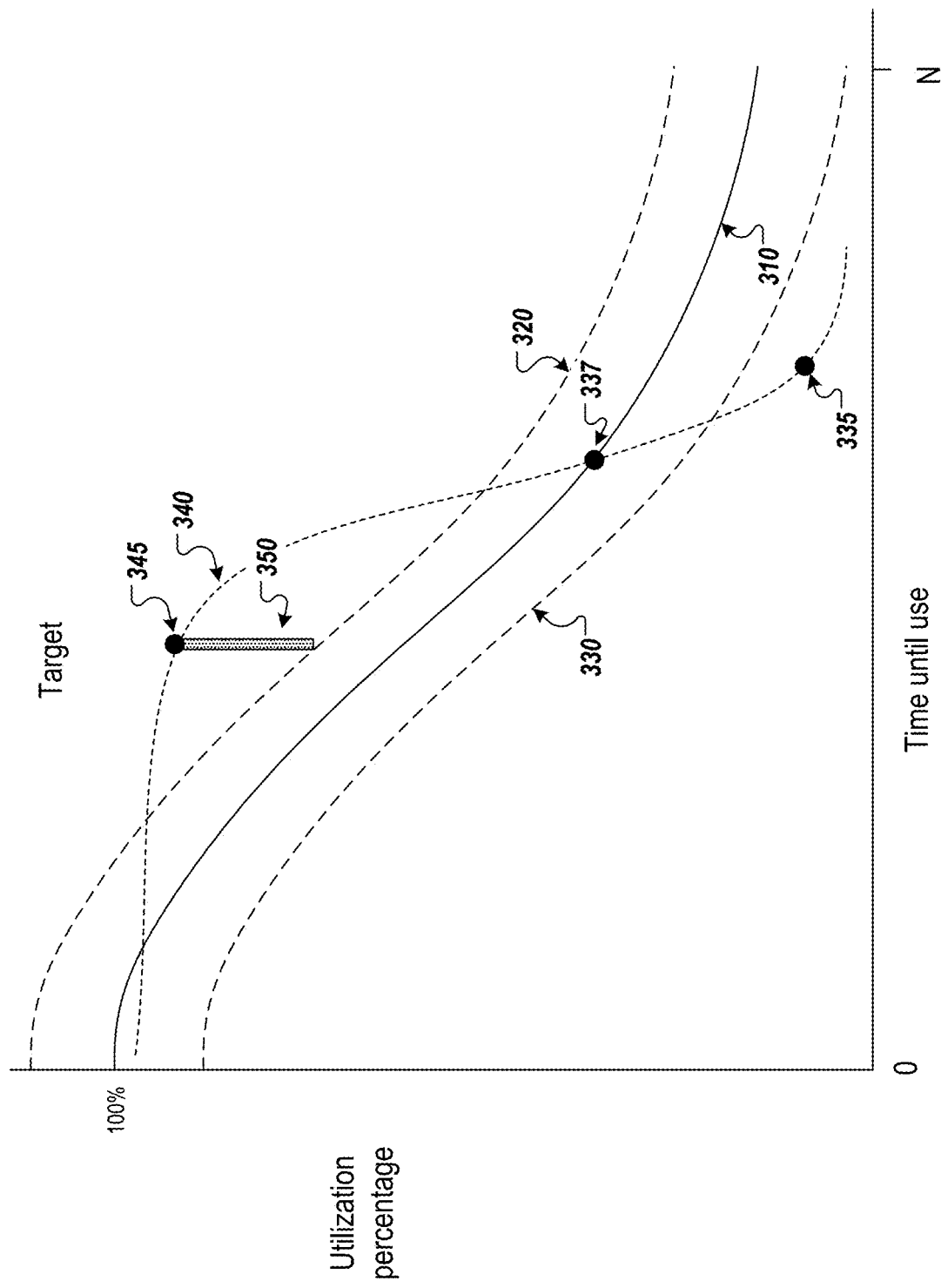

FIG. 3B also shows the example plot of target utilization as a function of time until the start of the resource usage time period, and also includes actual reservation levels 340 at various time periods. Toward the beginning of the scheduling period (e.g., at point 335), the actual reservation level 340 is below the target curve 310, and is also below the lower bound 330. Such a condition can indicate that that scheduling criteria are too restrictive, which is inhibiting resources users from reserving resources. In response, the system can adjust the scheduling criteria to be more permissive.

As time progresses, perhaps in response to a change in the scheduling criteria, the actual reservation level 340 crosses the target curve 340 at point 337, which can indicate that the scheduling criteria are set properly. As time progresses further, the actual reservation level 340 is above the target curve 310, and is also above the upper bound 320. Such a condition can indicate that that scheduling criteria are too permissive, which can lead to a suboptimal use of resource. In response the system can adjust the scheduling criteria to be more restrictive.

As is illustrated in FIG. 3B, the scheduling criteria can influence resource reservation. In one example, the system can set scheduling criteria that increase or decrease the number of credits that are required to be submitted to use a resource at a given start time, and the resource user can only schedule a resource if the user has sufficient credits available. Other units of value, such as currency, can be used in addition to or instead of credits such that the credits represent these other units of value. The number of required credits can also be based on the amount of time until the start time for use of the requested resources, e.g., based on the callout time period corresponding to the resource usage time period. For example, the number of required credits can increase with a decrease in the callout time period. In some implementations, the system allocates credits to users such that the system can ensure that one resource user does not monopolize use to the resources by limiting the number of credits available to that user.

In addition, the system can use scheduling criteria to balance demand for resources. By imposing more stringent scheduling criteria, e.g., by requiring more credits, the system can reduce demand to resources at peak time. Similarly, by imposing less stringent scheduling criteria, e.g., by requiring fewer credits, the system can increase demand for resources at off-peak times.

Returning to FIG. 2A, to adjust the scheduling criteria, in some implementations, the system can apply rules. In one example, a scheduling criterion adjustment rule can specify that system can adjust the criteria by a factor that depends on the level of difference, as illustrated in Equation 4A, below:

$$\text{Criterion}_{updated} = \text{Criterion}_{prior} * (\text{Reservation}_{actual}/\text{Reservation}_{target}) \quad (4A)$$

Where $\text{Criterion}_{updated}$, represents the criterion after the adjustments, $\text{Criterion}_{prior}$ represents the criterion before the adjustment, Reservation actual represents the amount of resource that has been reserved at a particular time period, and $\text{Reservationd}_{target}$ represents the target amount of resource reservations at that particular time period.

Equation 4A is only one example of an update determination. Various other approaches can be used, as illustrated, without limitation, in Equations 4B and 4C:

$$\text{Criterion}_{updated} = \text{Criterion}_{prior} * (\text{Reservation}_{actual}/\text{Reservation}_{target})^2 \quad (4B)$$

$$\text{Criterion}_{updated} = \text{Criterion}_{prior} - \frac{\text{Reservation}_{actual} - \text{Reservation}_{target}}{\text{Reservation}_{target}} \quad (4C)$$

Other rules can further constrain the update. For example, a rule can specify that a criterion should be updated only if the actual reservation level and the target reservation level differ by more than a configured threshold, which can be a percentage or an amount. In another example, rules can specify that within a certain number of time periods of the start time, criteria should not be changed. In another example, the threshold for change can increase as the start time nears.

In some implementations, the system assigns the resource usage time period to one of multiple resource scheduling levels depending on differences between the actual utilization and the target utilization over time. For example, the system can make a resource usage time period open for reservations a given amount of time before the start of the resource usage time period, e.g., 30 or 90 days before the start of the resource usage time period. Other appropriate time periods can also be used.

The system can also adjust the scheduling criteria for the resource usage time period based on the current resource scheduling level assigned to the resource usage time period. For example, each resource scheduling level can have a corresponding scheduling factor that is applied to the scheduling criterion for the resource usage time period when the resource scheduling time period is assigned to the resource scheduling level. In some cases, the scheduling factor can be a percentage value (e.g., 5%, 10%, 20%, 105%, 110%, 120%, etc.) that is multiplied by the scheduling criterion. In some cases, the scheduling factor is an amount that is added to the scheduling criterion.

When a resource usage time period is first opened, the system can assign the resource usage time period to a base level. As the system evaluates the actual and target utilization rates over time until the resource usage time period occurs, the system can increase the resource scheduling level, decrease the resource scheduling level, or keep the resource scheduling level unchanged.

For example, each time the system determines to update the scheduling criteria for the resource usage time period based on the actual utilization rate exceeding the target utilization rate, the system can move the resource usage time period to a higher resource scheduling level assuming that the resource usage time period is not at the highest level. As the resource scheduling level increases, the system can increase the number of credits required to reserve resources using the scheduling factor of the new resource scheduling level. Similarly, each time the system determines to update the scheduling criteria for the resource usage time period based on the actual utilization rate being less than the target utilization rate, the system can move the resource usage time period to a lower resource scheduling level assuming that the resource usage time period is not at the lowest level. As the resource scheduling level decreases, the system can reduce the number of credits required to reserve resources using the scheduling factor for the new resource scheduling level.

In some implementations, the system can use a machine learning model to adjust criteria. The machine learning model can be a neural network that is configured to produce criteria adjustments. The machine learning model can be trained using backpropagation on examples that can include, for each example, time to start, actual utilization, scheduling criteria, the target utilization curve, and an outcome label. The outcome label can be positive if the final actual utilization for the training example is within a configured amount of 100% and negative otherwise.

To adjust the criteria, the system can process an input that can include the time to start, the actual utilization, the scheduling criteria and the target utilization curve. The result can be a recommended adjustment to the scheduling criteria. The system can apply the recommended adjustment to the scheduling criteria to produce adjusted scheduling criteria.

The system can evaluate the scheduling criteria at various intervals. In some implementations, the system can evaluate the scheduling criteria at regular, configured intervals. In some implementations, the system can evaluate the scheduling criteria at times that vary based on time or conditions. For example, the system can evaluate the scheduling criteria more frequently as the start time approaches. In another example, the system can determine a next evaluation time based on the stability of the system—that is, when actual demand is close to target demand (e.g., within 1%, 2% or 5%), the system evaluates scheduling criteria less often, and when actual demand differs substantially from target demand (e.g., more than 10%, 15% or 20%), the system evaluates scheduling criteria more often.

The system can provide (230) the adjusted scheduling criterion to one or more resource consumers. The system can use any appropriate data sharing technique. For example, the system can transmit the adjusted scheduling criteria over HTTP or TCP, or the system can place the criteria in a data repository such as a shared file or a database.

The system can receive (235) an additional request to consume resource from a resource. The system can receive the request to consume resources using the techniques of operation 205 or similar techniques.

The system can determine (240) whether the adjusted scheduling criterion are satisfied. The system can compare the resource request to the scheduling criteria, as described above. If the criteria are satisfied, the system can proceed to operation 245; if the criteria are not satisfied, the system can proceed to operation 249 and terminate.

The system can provide (245) the additional workload to a resource configured to perform the additional workload. In some implementations, the system can provide the resource request to the target resource. For example, if the target resource is a computing system, the system can provide a reference to the code to be executed by the computing system. In another example, if the target resource is a transportation vehicle, the system can provide information about the workload, such as the route, cargo manifest, passenger list, and so on. The system can provide the workload to the resource using any appropriate communication mechanism. For example, the system can transmit the workload over HTTP or TCP, place the workload in a shared location (e.g., file system or database), transmit the workload over a messaging system (e.g., e-mail, Short Message System (SMS), Multimedia Messaging System (MMS), etc.), and so on.

In cases where the resource requires a description of the workload to be encoded in a specific format, e.g., formatted according to a particular XML schema, the system can perform a schema-to-schema mapping from the format of the workload request to the particular schema. The system can obtain a mapping dictionary that defines, for each field required by the resource-specific format, the corresponding value within workload request. For example, the workload request might specify a resource type as "CPU" and corresponding element in the resource-specific format might have a type "Processor." The system can use the dictionary to map fields from the workload request to the resource-specific format.

The dictionary can further define transformations between mapped fields. For example, if the workload request defines distances in miles, and the resources-specific format specifies kilometers, the dictionary can specify that the system should multiply the value from the workload request by 0.6 before producing the corresponding field in the resource-specific format. The system can apply the conversion factors when creating the resource-specific format.

To improve the accuracy of the data used to determine and to update actual utilization rates for a set of resources and the speed at which such determinations and updates are made, in some implementations, the system performs data preprocessing. Data preprocessing can include data cleansing such as detecting, correcting and removing inaccurate records from a data set, which can include identifying incomplete, incorrect, inaccurate or irrelevant parts of the data and then replacing, modifying, or deleting such data. Preprocessing can also include normalizing the data, which can include formatting the data into a common format and normalizing the data based for each particular resource usage time period based on the number of resource usage time periods between the current time and the start of the particular resource usage time period.

Figure 2B:
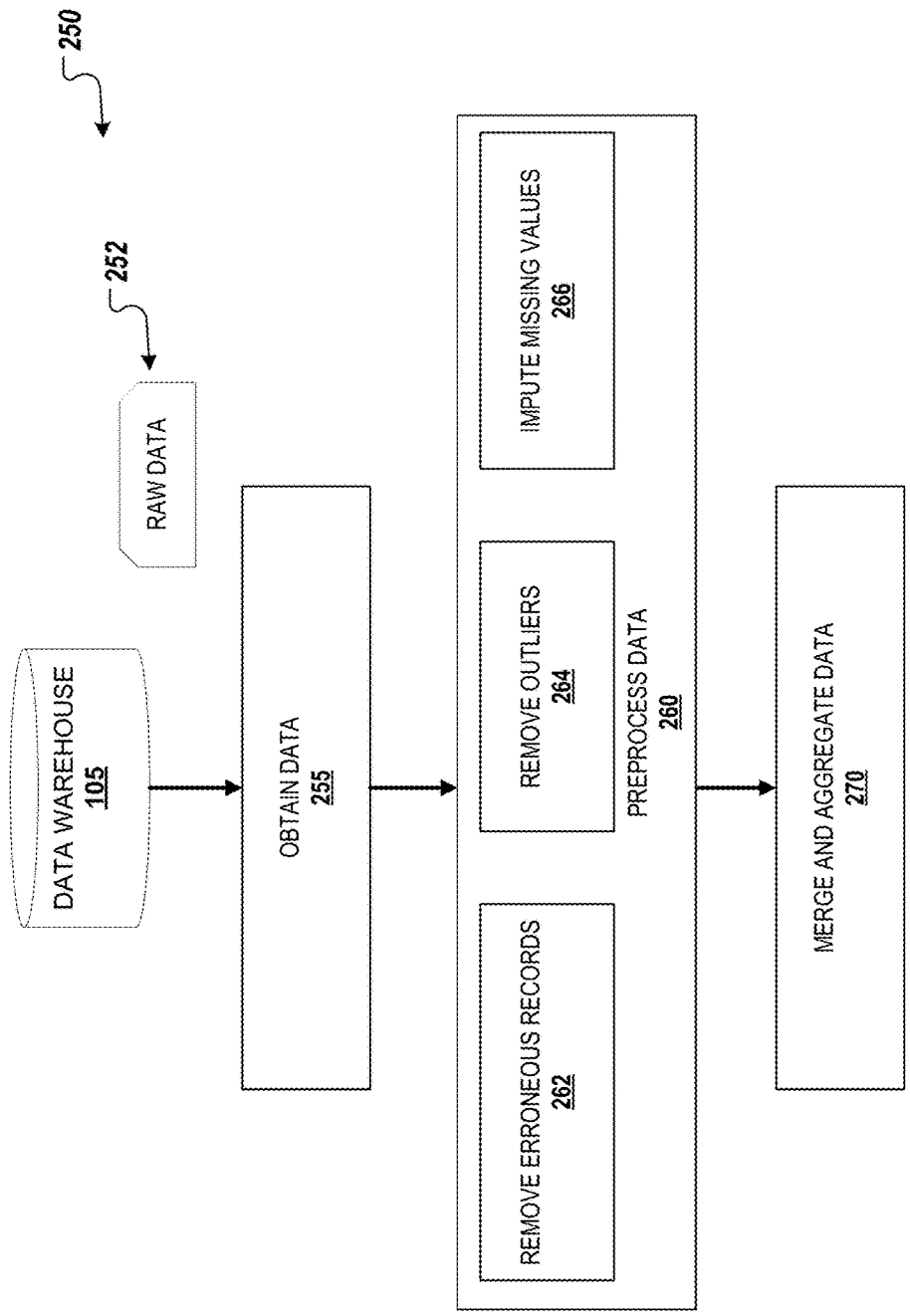
FIG. 2B is a flow diagram of an example process for preprocessing data.

FIG. 2B is a flow diagram of an example process 250 for preprocessing data when scheduling resources using scheduling criteria. For convenience, the process 250 will be described as being performed by a data preprocessing engine, e.g., the data preprocessing engine 140 of FIG. 1, appropriately programmed to perform the process. Operations of the process 250 can also be implemented as instructions stored on one or more computer readable media which may be non-transitory, and execution of the instructions by one or more data processing apparatus can cause the one or more data processing apparatus to perform the operations of the process 250. One or more other components described herein can perform the operations of the process 250.

The data preprocessing engine can obtain (255) raw data 252. In some implementations, the data preprocessing engine can obtain the data by retrieving the data from one or more data warehouses (e.g., the data warehouses 105 of FIG. 1) using, for example, Structured Query Language (SQL) queries. In some implementation, the data preprocessing engine can provide an API, and a data source (e.g., a data warehouse 105) can call the API to provide the data to the data preprocessing engine. The raw data 252 can represent historical workloads executing on resources of the system. For example, raw data 252 can include, for a set of durations from the start time (e.g., 1 day, 2 days, 3 days, etc.), the amount of resources that had been reserved or scheduled. The raw data 252 can also include the corresponding amount of resources that had been reserved or scheduled at that start time, which is optimally at or near 100% to indicate that the resource is fully utilized.

The data preprocessing engine can preprocess (260) the raw data 252, which can include a variety of operations that can include, without limitation, removing erroneous records, removing outliers and correcting missing values.

In some implementations, the data preprocessing engine removes erroneous data (262). The data preprocessing engine can include a set of data validation rules that determine whether data are correct or erroneous. In some implementations, the data preprocessing engine can contain positive and negative rules. If a positive rule evaluates to TRUE, the data item is determined to be valid. If a negative rule evaluated to TRUE, the data item is determined to be invalid. If both a positive and a negative rule evaluate to TRUE, the data item can be determined to be invalid. In some implementations, the data preprocessing engine contains only negative rules. Data items are determined to be valid only if a negative rule evaluated to TRUE.

In some implementation, the data preprocessing engine can detect erroneous data using a machine learning model that is configured to produce a prediction describing validity of the data. The machine learning model can be trained on examples, and each example can contain a data item and a label that indicates whether the data item is valid or invalid. Once the machine learning model is trained, the data preprocessing engine can process an input that includes a data item using the machine learning to produce a data validity prediction. If the data item is predicted to be invalid, the system can mark the item as invalid.

In some implementations, invalid items can be presented to a user for review. The data preprocessing engine can produce user interface presentation data that describes one or more incorrect data items and allows a user to review all of the items or any subset. The data preprocessing engine can provide the user interface presentation data to a client device, and the client device can render the user interface presentation data. By interacting with the user interface presentation data, the user can make corrections, and provide the correct data to the data preprocessing engine. In some implementations, invalid items can be removed without further review. In some implementations, invalid items are recorded in a log file.

In some implementations, the data preprocessing engine can remove (264) outliers. The data preprocessing engine can compare one or more fields within the data item to a data item model, and remove items that fall outside a confidence interval. For example, the data preprocessing engine can determine a statistical average (e.g., a mean) for each field within the set of data items, and compare the fields of one or more data items to the statistical average. If the data item falls outside a confidence interval (e.g., 90%, 95%, 98%, etc.), the data preprocessing engine can remove the data item. In some implementations, the data preprocessing engine can provide notice of the removal, for example, by adding an entry to a log file or by providing a message to a user.

In some implementations, the data preprocessing engine can impute (266) missing values. In some implementations, the data preprocessing engine can replace missing fields within data items by a statistical average of the fields of the remaining data items. In various implementations, the statistical average can be a mean value, a median value, a mode value, a weighted average or another statistical average. The data preprocessing engine can use other statistical imputation techniques in addition or instead.

In some implementations, the data preprocessing engine can merge and aggregate (270) the preprocessed data with one or more workload requests to determine a workload demand at the time of the request. The workload request can be appended to the preprocessed data to create the merged data that contains both the preprocessed data and the workload request.

Figure 4:
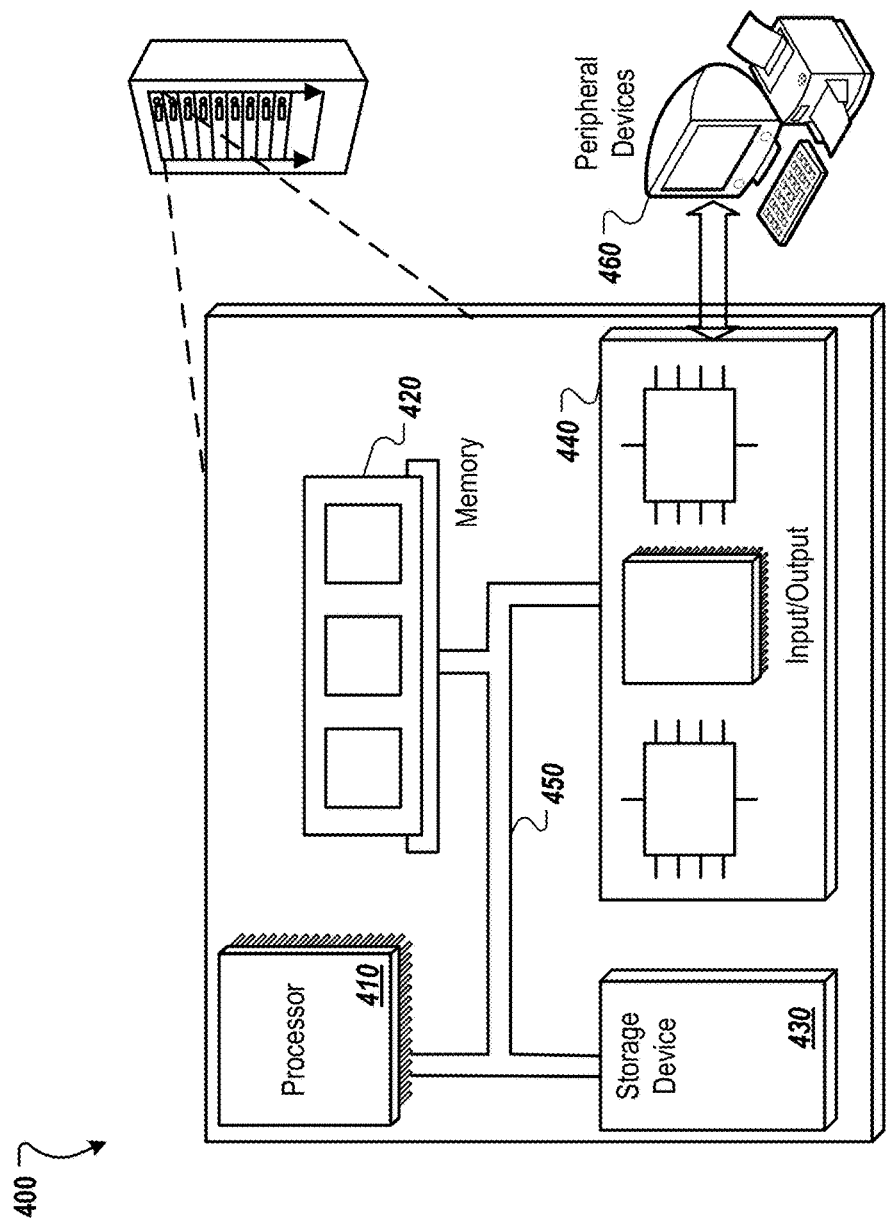
FIG. 4 is a block diagram of an example computer system.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, special purpose microprocessors. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computing device capable of providing information to a user. The information can be provided to a user in any form of sensory format, including visual, auditory, tactile or a combination thereof. The computing device can be coupled to a display device, e.g., an LCD (liquid crystal display) display device, an OLED (organic light emitting diode) display device, another monitor, a head mounted display device, and the like, for displaying information to the user. The computing device can be coupled to an input device. The input device can include a touch screen, keyboard and a pointing device, e.g., a mouse or a trackball, by which the user can provide input to the computing device. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiments described above can be combined with any of the other features of the embodiments described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
  obtaining, by a resource scheduler and from multiple resource consumers, resource requests for consuming a set of resources, each resource request comprising (i) an indication of a workload comprising one or more tasks to be performed by a resource and (ii) an indication of a start time for the workload;
  updating, based on one or more requirements of each workload and for each of a plurality of resource usage time periods for the set of resources, a respective actual utilization rate for the set of resources during the resource usage time period;

for each resource usage time period, comparing the respective actual utilization rate for the resource usage time period to a target utilization rate;

determining, based on the comparing, that the respective actual utilization rate for a given resource usage time period is at least a threshold amount different from the target utilization rate;

for the given resource usage time period:
adjusting a scheduling criterion that conditions subsequent resource requests for the set of resources on the subsequent resource requests satisfying the scheduling criterion for the given resource usage time period based at least on the respective actual utilization rate for the given resource usage time period being at least the threshold amount different from the target utilization rate;

providing the adjusted scheduling criterion to one or more resource consumers;

receiving, from a given resource consumer of the one or more resource consumers, an additional resource request comprising (i) an indication of an additional workload and (ii) an indication of a start time of the additional workload that occurs during the given resource usage time period; and in response to determining that the additional workload satisfies the adjusted scheduling criterion, effectuating performance of one or more tasks of the additional workload by a given resource of the set of resources.

2. The computer-implemented method of claim 1, wherein adjusting a scheduling criterion further comprises:

processing input data comprising characteristics of one or more resource requests using a trained machine learning model trained to output a recommended adjustment to the scheduling criterion;

updating the scheduling criterion using the recommended adjustment; and updating a user interface of one or more resource consumers to display the updated scheduling criterion.

3. The computer-implemented method of claim 1, wherein adjusting a scheduling criterion further comprises evaluating a scheduling criterion adjustment rule.

4. The computer-implemented method of claim 1, wherein the additional resource request is a request to create a new client-initiated private jet segment.

5. The computer-implemented method of claim 1, wherein updating the respective actual utilization rate for each resource usage time period comprises determining a reset penalty, wherein the reset penalty represents a number repositioning segments during previous resource usage time periods.

6. The computer-implemented method of claim 1, further comprising determining the target utilization rate based on an average of prior actual utilization curves.

7. The computer-implemented method of claim 1, wherein updating the respective actual utilization rate for each resource usage time period comprises preprocessing historical utilization rate data, wherein preprocessing the historical utilization rate data comprises one or more of removing erroneous data, removing outliers, or imputing missing values.

8. The computer-implemented method of claim 7, wherein preprocessing the historical utilization rate data comprises receiving data related to previous resource usage from multiple data sources and formatting the received data into a common format for which a machine learning model is configured to process as input to the machine learning model.

9. The computer-implemented method of claim 1, wherein adjusting a scheduling criterion for the given resource usage time period comprises determining to adjust the scheduling criterion based on (i) the respective actual utilization rate for the given resource usage time period being at least a threshold amount different from the target utilization rate and a hysteresis period for the given resource usage time period being elapsed.

10. The computer-implemented method of claim 1, wherein the respective actual utilization rate for each resource usage time period is based on a number of resources in the set of resources, a workload factor that represents the number of workloads a resource performed during a resource usage time period, and a duration factor that represents a duration of workloads.

11. The computer-implemented method of claim 1, wherein adjusting the scheduling criterion comprises:

determining a number of resource usage time periods between a current time and a time at which the given resource usage time period is scheduled to begin; and
adjusting the scheduling criterion based on the number of resource usage time periods.

12. The computer-implemented method of claim 1, wherein each resource request comprises a request to create a new client-initiated private jet segment.

13. A system comprising:
one or more computers; and
one or more computer memory devices interoperably coupled with the one or more computers and having tangible, non-transitory, machine-readable media storing one or more instructions that, when executed by the one or more computers, cause the one or more computers to perform operations comprising:

obtaining, by a resource scheduler and from multiple resource consumers, resource requests for consuming a set of resources, each resource request comprising (i) an indication of a workload comprising one or more tasks to be performed by a resource and (ii) an indication of a start time for the workload;

updating, based on one or more requirements of each workload and for each of a plurality of resource usage time periods for the set of resources, a respective actual utilization rate for the set of resources during the resource usage time period;

for each resource usage time period, comparing the respective actual utilization rate for the resource usage time period to a target utilization rate;

determining, based on the comparing, that the respective actual utilization rate for a given resource usage time period is at least a threshold amount different from the target utilization rate;

for the given resource usage time period:
adjusting a scheduling criterion that conditions subsequent resource requests for the set of resources on the subsequent resource requests satisfying the scheduling criterion for the given resource usage time period based at least on the respective actual utilization rate for the given resource usage time period being at least the threshold amount different from the target utilization rate;

providing the adjusted scheduling criterion to one or more resource consumers;

receiving, from a given resource consumer of the one or more resource consumers, an additional resource request comprising (i) an indication of an additional workload and (ii) an indication of a start time of the additional workload that occurs during the given resource usage time period; and in response to determining that the additional workload satisfies the adjusted scheduling criterion, effectuating performance of one or more tasks of the additional workload by a given resource of the set of resources.

14. The system of claim 13, wherein adjusting a scheduling criterion further comprises:

processing input data comprising characteristics of one or more resource requests using a trained machine learning model trained to output a recommended adjustment to the scheduling criterion;

updating the scheduling criterion using the recommended adjustment; and updating a user interface of one or more resource consumers to display the updated scheduling criterion.

15. The system of claim 13, wherein adjusting a scheduling criterion further comprises evaluating a scheduling criterion adjustment rule.

16. The system of claim 13, wherein the additional resource request is a request to create a new client-initiated private jet segment.

17. The system of claim 13, wherein updating the respective actual utilization rate for each resource usage time period comprises determining a reset penalty, wherein the reset penalty represents a number repositioning segments during previous resource usage time periods.

18. The system of claim 13, wherein the operations comprise determining the target utilization rate based on an average of prior actual utilization curves.

19. The system of claim 13, wherein updating the respective actual utilization rate for each resource usage time period comprises preprocessing historical utilization rate data, wherein the preprocessing the historical utilization rate data comprises one or more of removing erroneous data, removing outliers, or imputing missing values.

20. The system of claim 13, wherein adjusting a scheduling criterion for the given resource usage time period comprises determining to adjust the scheduling criterion based on (i) the respective actual utilization rate for the given resource usage time period being at least a threshold amount different from the target utilization rate and a hysteresis period for the given resource usage time period being elapsed.

21. The system of claim 13, wherein adjusting the scheduling criterion comprises:

determining a number of resource usage time periods between a current time and a time at which the given resource usage time period is scheduled to begin; and adjusting the scheduling criterion based on the number of resource usage time periods.

22. A non-transitory computer storage medium encoded with a computer program, the program comprising instructions that when executed by one or more data processing apparatus cause the one or more data processing apparatus to perform operations comprising:

obtaining, by a resource scheduler and from multiple resource consumers, resource requests for consuming a set of resources, each resource request comprising (i) an indication of a workload comprising one or more tasks to be performed by a resource and (ii) an indication of a start time for the workload;

updating, based on one or more requirements of each workload and for each of a plurality of resource usage time periods for the set of resources, a respective actual utilization rate for the set of resources during the resource usage time period;

for each resource usage time period, comparing the respective actual utilization rate for the resource usage time period to a target utilization rate;

determining, based on the comparing, that the respective actual utilization rate for a given resource usage time period is at least a threshold amount different from the target utilization rate;

for the given resource usage time period:

adjusting a scheduling criterion that conditions subsequent resource requests for the set of resources on the subsequent resource request satisfying the scheduling criterion for the given resource usage time period based at least on the respective actual utilization rate for the given resource usage time period being at least the threshold amount different from the target utilization rate;

providing the adjusted scheduling criterion to one or more resource consumers;

receiving, from a given resource consumer of the one or more resource consumers, an additional resource request comprising (i) an indication of an additional workload and (ii) an indication of a start time of the additional workload that occurs during the given resource usage time period; and in response to determining that the additional workload satisfies the adjusted scheduling criterion, effectuating performance of one or more tasks of the additional workload by a given resource of the set of resources.

23. The non-transitory computer storage medium of claim 22, wherein each resource request comprises a request to create a new client-initiated private jet segment.

* * * * *

UNITED STATES PATENT AND TRADEMARK OFFICE
CERTIFICATE OF CORRECTION

PATENT NO. : 12,314,757 B1
APPLICATION NO. : 18/205702
DATED : May 27, 2025
INVENTOR(S) : Vinay Roy et al.

Page 1 of 1

It is certified that error appears in the above-identified patent and that said Letters Patent is hereby corrected as shown below:

In the Claims

Column 21, Line 52: In Claim 5, after "number" insert -- of --.

Column 23, Line 31: In Claim 17, after "number" insert -- of --.

Column 23, Line 39: In Claim 19, after "wherein" delete "the".

Column 24, Line 31 (approx.): In Claim 22, delete "request" and insert -- requests --.

Signed and Sealed this
Twenty-second Day of July, 2025

Coke Morgan Stewart
*Acting Director of the United States Patent and Trademark Office*